July 14, 1936.   O. J. ROBILLARD   2,047,887
MICROMETER CALIPER
Filed May 13, 1935
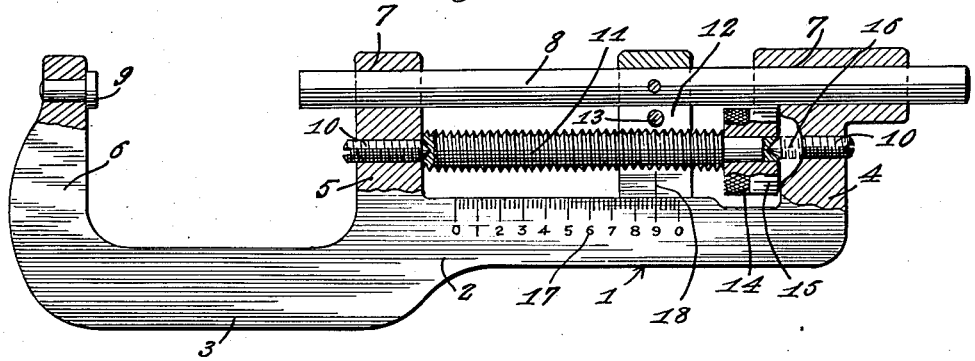
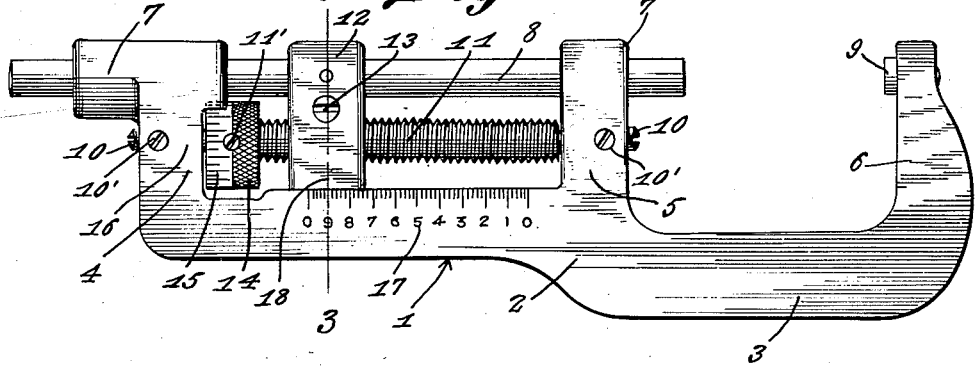
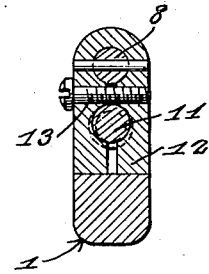
Oscar J. Robillard, INVENTOR
BY Victor J. Evans & Co.
ATTORNEY Patented July 14, 1936

2,047,887

UNITED STATES PATENT OFFICE 2,047,887

MICROMETER CALIPER

Oscar J. Robillard, Attleboro, Mass.

Application May 13, 1935, Serial No. 21,227

1 Claim. (Cl. 33—164)

This invention relates to micrometer calipers, and has for the primary object the provision of an instrument of this character which will be accurate in measurement of a device to which it is applied and such measurements may be easily and quickly read and being of such a construction that its adaptation to a device to be measured may be easily had and which is simple in construction, durable and efficient in operation and may be manufactured and sold at a low cost.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, partly in section, illustrating a micrometer caliper constructed in accordance with my invention.

Figure 2 is a view similar to Figure 1, showing the opposite side thereof.

Figure 3 is a transverse sectional view taken on the line 3—3 of Figure 2.

Referring in detail to the drawing, the numeral 1 indicates a frame of the instrument which includes an elongated member 2 slightly offset, as shown at 3, and integral with and projecting from one edge of the member 2 are spaced members 4 and 5 and an arm 6, the latter being located at one end of the offset portion 3 of the member 2. Bearings 7 are integral with the members 4 and 5 and slidably support a rod or shaft 8, one end of which cooperates with an anvil 9 carried by the arm 6 for engaging an object to be measured. The members 4 and 5 have threaded thereto journal elements 10 which engage in recessed ends of a feed shaft 11 for the purpose of rotatably supporting said feed shaft, the latter being equipped with feed threads of a selected size for a measurement. The journals 10 being capable of adjustment with respect to the members 4 and 5 will compensate for wear occurring between said journals and the ends of the feed shaft. The journals may be locked by set bolts 10'. A feed nut 12 meshes with the feed threads of the feed shaft and has an opening to receive the shaft or rod 8 and is pinned or otherwise secured to the latter. The feed nut includes a bifurcated portion which receives the feed shaft and is clamped to the latter by a set bolt 13, providing a construction whereby the feed nut may be adjusted on the feed shaft to compensate for wear. A finger piece 14 is secured to the feed shaft by a set screw 11', and a portion of the face of said finger piece has applied thereto graduations of a scale 15. Scale markings 16 are provided on either or both faces of the member 4 or if desired, only upon one face of said member 4 for cooperation with the markings of the scale 15. Scales 17 are provided on the member 2, either upon both faces or upon one face of said member and the distances between the markings of at least one of the scales 17, when both are employed, indicates the distance between each thread of the feed threads on the shaft 11. Operating in conjunction with the markings of the scales 17 are markings 18 on the feed nut. The feed nut moves relative to the scales 17 and said scales 17 and markings 18 permit a person to readily determine the measurement of an object to which the device is applied. The set screw 11' provides means for adjusting graduation 15 on finger piece 14 in correct position relative to helix of threads on feed shaft 11 which operates marking 18 on feed nut in conjunction with scale 17. It is to be understood that only one scale 17 may be employed on the device which also applies to the scale markings 18 on the feed nut. Further, when the scales 17 are applied to opposite sides of the device they may not be the same. One may relate to a measuring system of one kind while the other may relate to another measuring system. Incomplete revolutions of the feed shaft are read by the scale 15 and complete revolutions of the feed shaft are read upon either of the scales 17. The rotation of the feed shaft by the finger piece 14 in one direction will advance the shaft or rod 8 towards the anvil 9 and rotation of the feed shaft in an opposite direction will move the rod or shaft 8 away from said anvil.

In operation, the instrument is placed on an object to be measured, by bringing the anvil 9 and one end of the shaft 8 in engagement with the object opposite to one another upon said object, it being understood that the shaft 8 is advanced in engagement with said object with the latter contacting the anvil by the rotation of the feed shaft through the manipulation of the finger piece 14. By referring to the scale 17 and the marking 18 on the feed nut and also the scale 15 with the marking on the member 4 an accurate reading for the measurement of said object will be easily obtained.

Having described the invention, I claim:

A micrometer caliper comprising an elongated member having a portion thereof offset with the offset extending to one end of said member, an arm formed on said end of the member and extending at right angles to the latter, spaced members paralleling said arm and formed on the elongated member with one of the second-named members located adjacent the offset, an anvil secured to said arm, a rod slidably mounted in the second-named members and aligning with the anvil, journals adjustably secured to the second-named members, a feed shaft rotatably supported by the journals by the latter contacting the ends of the feed shaft for supporting said feed shaft between the elongated member and the rod and paralleling the latter, a feed nut mounted on the feed shaft and secured to said rod and having a scale marking, a scale located on said elongated member for cooperating with the scale marking, and a finger piece having a scale adjustably secured to the feed shaft.

OSCAR J. ROBILLARD.